(12) United States Patent
Davies et al.

(10) Patent No.: US 11,428,547 B2
(45) Date of Patent: Aug. 30, 2022

(54) SIGNAL CONDITIONING CIRCUIT FOR USE WITH ACTIVE MAGNETIC BEARINGS

(71) Applicant: Waukesha Bearings LTD, Worthing (GB)

(72) Inventors: Nigel George Davies, Worthing (GB); Chiu Hon Leung, Lewes (GB)

(73) Assignee: Waukesha Bearings LTD., Worthing (GB)

(*) Notice: Subject to any disclaimer, the term of this patent is extended or adjusted under 35 U.S.C. 154(b) by 317 days.

(21) Appl. No.: 16/808,744

(22) Filed: Mar. 4, 2020

(65) Prior Publication Data
US 2020/0284617 A1 Sep. 10, 2020

(30) Foreign Application Priority Data

Mar. 8, 2019 (GB) ...................................... 1903224

(51) Int. Cl.
*G01D 5/22* (2006.01)
*F16C 32/04* (2006.01)

(52) U.S. Cl.
CPC .......... *G01D 5/22* (2013.01); *F16C 32/0474* (2013.01); *F16C 2233/00* (2013.01)

(58) Field of Classification Search
CPC .............. F16C 32/0446; F16C 32/0474; F16C 2233/00; G01D 5/22; G01D 5/202; G01B 7/14; H02K 11/225; H02K 7/09; H02K 11/21; H02K 11/215
See application file for complete search history.

(56) References Cited

U.S. PATENT DOCUMENTS

| | | | |
|---|---|---|---|
| 3,650,581 A | | 3/1972 | Boden et al. |
| 4,967,154 A | * | 10/1990 | Marantette ............. G01B 7/312 73/660 |
| 2014/0252899 A1 | | 9/2014 | Looser |
| 2017/0097438 A1 | | 4/2017 | Reime |
| 2018/0241327 A1 | * | 8/2018 | Wang ........................ H02P 6/17 |

FOREIGN PATENT DOCUMENTS

| | | |
|---|---|---|
| EP | 2781887 A1 | 9/2014 |
| GB | 1500809 A | 2/1978 |

OTHER PUBLICATIONS

GB Application No. 1903224.2, Search Report dated Sep. 3, 2019.
EP Application No. 20161656, Search Report dated Jul. 16, 2020.

* cited by examiner

*Primary Examiner* — Steven L Yeninas
(74) *Attorney, Agent, or Firm* — Patterson Thuente Pedersen, P.A.

(57) ABSTRACT

There is provided an inductive sensing circuit, comprising a signal generator, configured to generate a drive signal; one or more sensing arrangements, each of the one or more sensing arrangements comprising: two sets of one or more inductive sensing elements, configured in a half bridge arrangement, the two sets of one or more inductive sensing elements driven by the drive signal; a correction signal circuit, configured to generate a correction signal, wherein the correction signal is an adjustably scaled version of the drive signal; and a summing circuit, configured to sum an output signal of the two sets of one or more inductive sensing elements with the correction signal; and a demodulation circuit, configured to demodulate an output of the summing circuit of each of the one or more sensing arrangements.

20 Claims, 10 Drawing Sheets

FIG. 9B Corrected Waveform

FIG. 9C In-phase component of Corrected Waveform

US 11,428,547 B2

SIGNAL CONDITIONING CIRCUIT FOR USE WITH ACTIVE MAGNETIC BEARINGS

RELATED APPLICATIONS

This application claims the benefit of priority to GB Application No. 1903224.2, filed Mar. 8, 2019, the entire disclosure of which is incorporated herein by reference.

TECHNICAL FIELD

The present invention relates to the field of electronics in general. In particular, the invention relates to an improved signal conditioning circuit for use with active magnetic bearings.

BACKGROUND

Active magnetic bearings for supporting a rotor traditionally comprise electromagnets with variable excitation controlled by displacement sensors using electronic servo circuits. The displacement sensors are sensitive to changes in the position of the rotor relative to a reference position. The displacement sensors may be of the optical, capacitive, eddy current or inductive type.

An inductive position sensor comprises a set of inductive elements with a variable gap fixed to the stator and cooperating with a reference ring, or 'target', integral with the rotor. The reference ring traditionally comprises a ring composed of magnetic sheets or made of ferrite. The reference ring must be manufactured with great care, as manufacturing defects and build tolerances limit the performance of the inductive sensor elements.

Bridge type inductive position sensors used for magnetic bearing applications traditionally use a phase sensitive (synchronous) de-modulation circuit implemented using analogue electronics. In order to optimise the performance of the synchronous de-modulation circuit, the phase of the reference waveform should be adjusted to match the phase of the output signal from the sensor when the rotor is displaced from the centre position. With analogue synchronous de-modulation circuits, this phase shifting is traditionally performed using RC filter networks which are matched when the system is in its final installation with the field cabling installed.

With the move towards automated and remote commissioning of magnetic bearing systems, this type of adjustment within the controller circuitry is inconvenient and a method of optimising the phase of the demodulation circuit remotely or automatically is desirable.

Accordingly, an improved signal conditioning circuit for use with magnetic bearings is desirable.

SUMMARY

The present invention provides an inductive sensing circuit comprising: a signal generator, configured to generate a drive signal; one or more sensing arrangements, each of the one or more sensing arrangements comprising: two sets of one or more inductive sensing elements configured in a half bridge arrangement, the two sets of one or more inductive sensing elements driven by the drive signal; a correction signal circuit configured to generate a correction signal, wherein the correction signal is an adjustably scaled version of the drive signal; and a summing circuit configured to sum an output signal of the two sets of one or more inductive sensing elements with the correction signal; and a demodulation circuit, configured to demodulate an output of the summing circuit of each of the one or more sensing arrangements.

The present invention also provides a method for correcting an output signal of two sets of one or more inductive sensor elements, the method comprising: generating a drive signal; driving the two sets of one or more inductive sensor elements by applying the drive signal; generating a correction signal, wherein the correction signal is an adjustably scaled copy of the drive signal; summing the output signal of the two sets of one or more inductive sensor elements with the correction signal; and demodulating the summed signal.

The present invention also provides an active magnetic bearing comprising the inductive sensing circuit disclosed herein.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 9A-9C show an example corrected waveform derived from a raw sensor signal such as in FIG. 4 obtained using the improved sensor design, along with an in-phase component of the corrected waveform.

DETAILED DESCRIPTION

Embodiments of the invention disclosed herein provide inductive position sensing apparatus and methods which are tolerant to errors from manufacturing tolerances of the reference ring or inductive sensor elements, but are also tolerant to mismatches in the impedance of opposed inductive sensing elements.

Throughout the following disclosure, reference shall be made to "inductive sensor elements". It should be understood that each inductive sensor element may not be a singular inductive sensor element, but instead may be one or more inductive sensor elements in a series arrangement.

Figure 1:
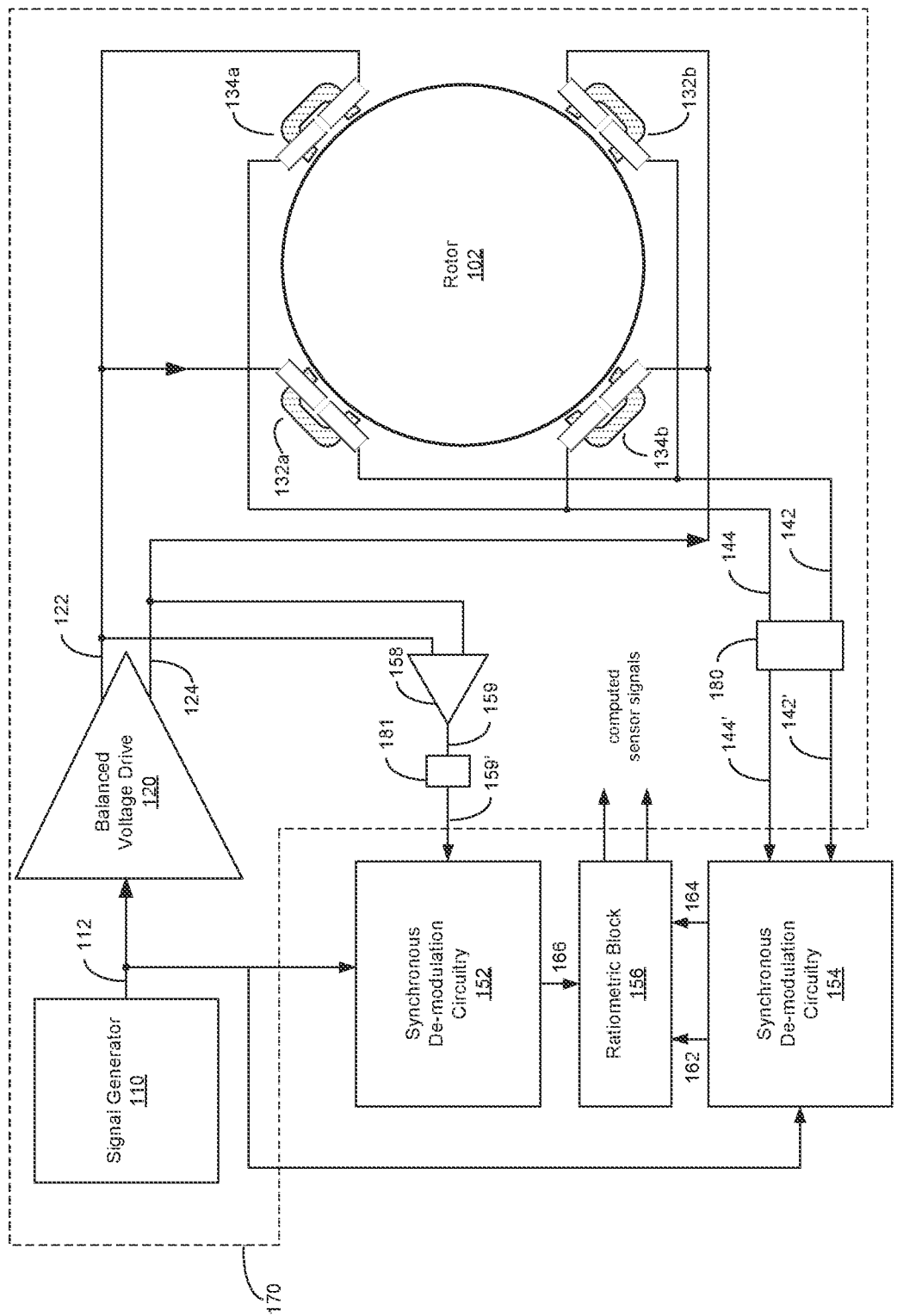
FIG. 1 shows a high level block diagram of a typical radial inductive position sensor arrangement.

FIG. 1 shows a high level block diagram of a typical radial inductive position sensor arrangement. Typically, synchronous de-modulation of the "in-phase" component of the signal is used to remove noise and/or interfering signals from the sensor outputs. FIG. 1 shows a plurality of inductive sensor elements 132a, 132b, 134a, and 134b, arranged around the circumference of rotor 102. Inductive sensor elements 132a and 132b form a first pair. Inductive sensor elements 134a and 134b form a second pair. First pair of inductive sensor elements 132a and 132b are circumferentially arranged diametrically opposite each other with respect to the axis of rotation of the rotor 102. Likewise, the second pair of inductive elements 134a and 134b are circumferentially arranged diametrically opposite each other with respect to the axis of rotation of the rotor 102. A signal generator 110 is configured to generate a sinusoidal drive signal 112. In some embodiments the drive signal may be non-sinusoidal and could be, for example, a square wave. Signal generator 110 is operably coupled to a balanced voltage drive 120. Signal generator 110 also provides a synchronisation signal to first and second synchronous de-modulation circuitry 152 and 154. This synchronisation signal may provide one input to a convolution algorithm used to perform synchronous de-modulation at the first and second synchronous de-modulation circuitry 152 and 154.

First pair of inductive sensor elements 132a and 132b is connected in a first half bridge arrangement. Second pair of inductive sensor elements 134a and 134b is connected in a second half bridge arrangement. A first output 122 of balanced voltage drive 120 is coupled to a first input of each of the first and second half bridge arrangements. A second output 124 of balanced voltage drive 120 is coupled to a second input of each of the first and second half bridge arrangements. Optionally, balanced voltage drive 120 may include circuitry configured to amplify the sinusoidal drive signal 122 from the signal generator 110. Although examples and embodiments herein reference use of balanced voltage drive 120, it should be understood that in some alternative embodiments a single-ended voltage drive may be used instead. An output 142 from the first half bridge arrangement is operably coupled to a first input of first optional signal conditioning circuitry 180. A first output 142' of first optional signal conditioning circuitry 180 is coupled to a first input of second synchronous de-modulation circuitry 154. An output 144 from the second half bridge arrangement is operably coupled to a second input of first optional signal conditioning circuitry 180. A second output 144' of first optional signal conditioning circuitry 180 is coupled to a second input of second synchronous de-modulation circuitry 154. Second synchronous de-modulation circuitry 154 is configured to remove noise and/or interfering signals from each of outputs 142' and 144' of the first (132a, 132b) and second (134a, 134b) half bridge inductive sensor element arrangements or optional signal conditioning circuitry 180 such that only the respective sensor output remains (i.e. the signal which indicates the position of the rotor 102 along a particular axis).

Element 158 converts a copy of outputs 122 and 124 (one or both) of balanced voltage drive 120 into a single ended signal 159. Single ended signal 159 from element 158 is operably coupled to an input of second optional signal conditioning circuitry 181. An output 159' of second optional signal conditioning circuitry 181 is coupled to an input of first synchronous de-modulation circuitry 152. First synchronous de-modulation circuitry 152 is configured to remove noise and/or interfering signals from single ended signal 159. First and second outputs 162 and 164 of second synchronous de-modulation circuitry 154 are operably coupled to first and second inputs of ratiometric block 156. Output 166 of first synchronous de-modulation circuitry 152 is operably coupled to a third input of ratiometric block 156. Although first and second synchronous de-modulation circuitry 152 and 154 are illustrated as separate blocks in FIG. 1, they may be implemented as a single circuit or as two or more separate circuits. Similarly, first and second optional signal conditioning circuitry 180 and 181 may be implemented as a single circuit or as multiple independent circuits. Ratiometric block 156 is configured to convert sensor signals 162 and 164 to a meaningful output signal for use in controlling the actuators and/or electromagnets of an Active Magnetic Bearing. Signal 166 is used as a reference signal in converting signals 162 and 164, in order to eliminate any effect caused by variation in the outputs of balanced voltage drive 120. Synchronous de-modulation can be performed using either analogue implementations or digital implementations.

In some examples, inductive sensor elements 132a, 132b, 134a and 134b may be spaced equidistant about the circumference of rotor 102 (i.e. 90 degrees between each of inductive sensor elements 132a, 132b, 134a and 134b). In some embodiments, the spacing between the inductive sensor elements 132a, 132b, 134a and 134b may not be equal. However, inductive sensor elements 132a and 132b may still be diametrically opposed, and inductive sensor elements 134a and 134b may still be diametrically opposed.

Figure 2:
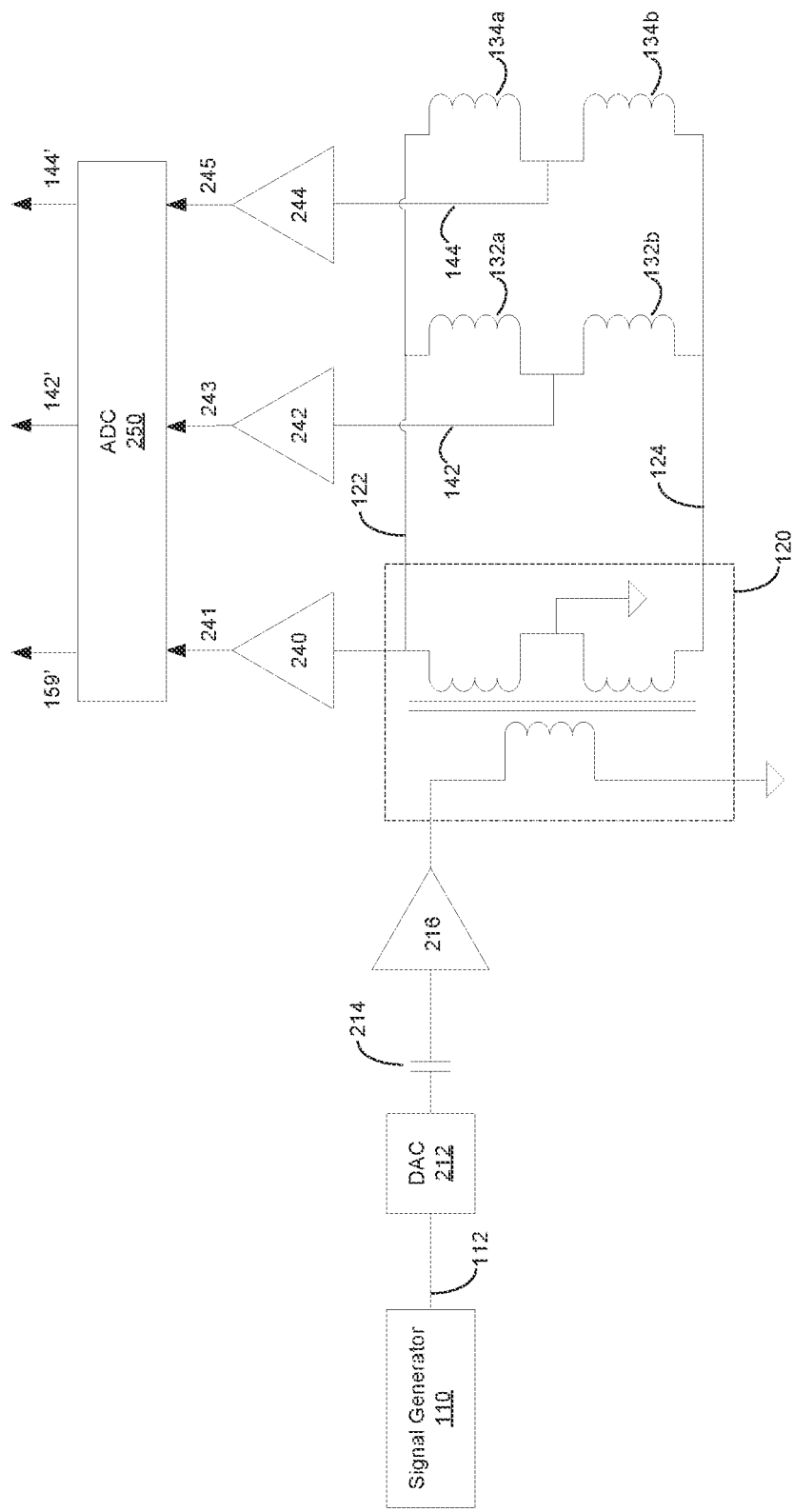
FIG. 2 shows the block diagram of a typical digital implementation for an inductive position sensor element arrangement.

FIG. 2 shows a typical sensor design for use with digital implementations of synchronous de-modulation of the inductive position sensor element output signals. The circuit of FIG. 2 provides an implementation of the elements of FIG. 1 inside box 170. FIG. 2 shows a signal generator 110, which is used to generate a sinusoidal drive signal 112 at a required frequency. In the embodiment of FIG. 2, signal generator 110 generates the signal digitally, however alternative embodiments may instead use an analogue signal generating stage. The signal generator 110 is operably coupled to a Digital-to-Analogue Converter (DAC) 212. The output of Digital-to-Analogue Converter (DAC) 212 is operably coupled to an Alternating Current (AC) couple 214. AC couple 214 is configured to eliminate any Direct Current (DC) component of the sinusoidal drive signal 112. The AC couple 214 may be, for example, a suitably sized capacitor. The output of AC couple 214 is operably coupled to a power amplifier 216. Power amplifier 216 is coupled to balanced voltage drive 120. In the embodiment of FIG. 2, the balanced voltage drive 120 is implemented using a transformer with multiple secondary windings, however in other embodiments alternative means of implementing a balanced voltage drive may be used. A reference signal from balanced voltage drive 120 is coupled to amplifier 240, in order to provide a reference signal for performing the ratiometric function of ratiometric block 156. A first output 122 of balanced voltage drive 120 is coupled to a first input of each of the first (132a, 132b) and second (134a, 134b) half bridge inductive sensor element arrangements. A second output 124 of balanced voltage drive 120 is coupled to a second input of each of the first (132a, 132b) and second (134a, 134b) half bridge inductive sensor element arrangements. The sensed signal 142 from first pair of inductive sensor elements 132a, 132b is coupled to amplifier 242. The sensed signal from second pair of inductive sensor elements 134a, 134b is coupled to amplifier 244. In some embodiments, amplifier stages 240, 242 and 244 may have adjustable gain. The respective outputs 241, 243 and 245 of amplifier stages 240, 242 and 244 are each coupled to the inputs of one or more Analogue-to-Digital Converters (ADC) 250. Analogue-to-Digital Converter(s) 250 are configured to convert analogue signals 241, 243 and 245 to digital signals 159', 142' and 144' respectively. Output 159' of Analogue-to-Digital Converter 250 is coupled to an input of first synchronous de-modulation circuitry 152 of FIG. 1. Outputs 142' and 144' of Analogue-to-Digital Converter 250 are coupled to first and second outputs of second synchronous de-modulation circuitry 154 of FIG. 1. Amplifier stages 240, 242 and 244 and Analogue-to-Digital Converter 250 may correspond to signal conditioning elements 180 and 181 of FIG. 1. First and second synchronous de-modulation circuitry 152 and 154 are coupled to ratiometric block 156 in the same manner as in FIG. 1. In the embodiment of FIG. 2, synchronous de-modulation circuitry 152 and 154, and/or ratiometric block 156, are implemented digitally.

Some digital implementations of the synchronous de-modulation circuitry 152 and 154, and ratiometric block 156 may combine Field Programmable Gate Arrays (FPGAs) or other control logic to handle the phase shifting and multiplication functions used for performing synchronous de-modulation, and Digital Signal Processors (DSPs) or other control processing to handle the ratiometric function. The DSPs may also be used to perform Active Magnetic Bearing servo control functions. In some embodiments, digital synchronous de-modulation of the output signal may comprise a programable signal generator 110 used to construct a sinusoidal drive signal 112 at a required frequency. In addition to the sinusoidal drive signal 112, the signal generator 110 may be configured to output a synchronising pulse for use by the first and second synchronous de-modulation circuitry 152 and 154, and/or ratiometric block 156. The signal generator 110 may be under the control of a supervisory FPGA or other control logic which may also be responsible for data communications and/or a supervisory state machine or other control logic which controls the sequencing of an overall Active Magnetic Bearing control system, which may include actuator elements or electromagnetic elements. Each Active Magnetic Bearing for use in a given installation may have its own control logic and/or processing, or control logic and/or processing may be shared between multiple Active Magnetic Bearings in a given installation.

Motion of a rotor 102 supported by an Active Magnetic Bearing system according to the present disclosure may be typically constrained by mechanical "touchdown bearings" (one at each end of the rotor 102). These will normally be operational with a clearance, but when the rotor moves out of position the rotor may contact the touchdown bearings. The Active Magnetic Bearing system will normally be configured with the "centre" position defined by the mechanical centre of the touchdown bearing clearances, as opposed to the mechanical centre of the sensor clearances or the mechanical centre of the actuator clearances.

Figure 3:
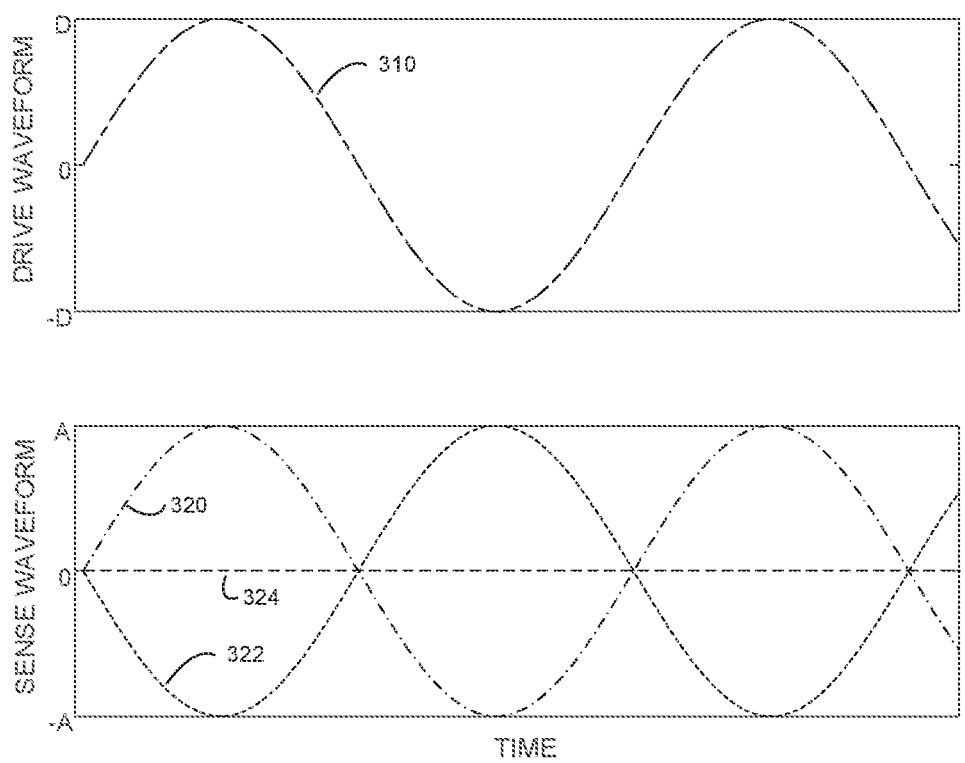
FIG. 3 shows an example of the output signal of a half bridge formed by an opposed pair of inductive sensor elements as the rotor is traversed in one axis of motion from contacting touchdown bearings on one side, through the mechanical centre position, to contacting the touchdown bearings on the opposite side, for an ideal system.

FIG. 3 shows a sinusoidal drive signal waveform 310 (which may be, for example, sinusoidal drive signal 112 generated by signal generator 110 of FIG. 1 or FIG. 2), and the ideal output signal of a half bridge inductive sensor element arrangement (which may be, for example, either half bridge inductive sensor element arrangement 132a, 132b; or half bridge inductive sensor element arrangement 134a, 134b) as the rotor 102 traverses (in one axis of motion) from contacting the touchdown bearings on one side (waveform 320), through the mechanical centre position (waveform 324) to contacting the touchdown bearings on the opposite side (waveform 322), for an ideal system.

The input gain on the Analogue-to-Digital Converter 250 may be set to optimise the usage of the available Analogue-to-Digital Converter 250 input range for the allowable range of motion (between contacting the touchdown bearings on one side and contacting the touchdown bearings on the other side). This is done in order to maximise signal to noise ratio and minimise the effects of quantisation noise (i.e. noise caused by the error between the real analogue value of the signal input to the ADC 250 and the sampled output value associated with the input signal). Similar input range considerations apply for analogue implementations of the synchronous de-modulation circuit and ratiometric block.

However, due to build tolerances the mechanical centre of the half bridge inductive sensor element arrangement may be offset from the mechanical centre of the touchdown bearings (i.e. a misalignment between mechanical centre of the half bridge inductive sensor element arrangement and the mechanical centre of the touchdown bearings). In this case, the output signal of the sensor as the rotor 102 traverses (in one axis of motion) from contacting the touchdown bearings on one side (waveform 420), through the mechanical centre position of the touchdown bearings (waveform 424) to contacting the touchdown bearings on the opposite side (waveform 422) could be, for example, as shown in FIG. 4.

Additionally, due to constructional and material tolerance of the inductive sensor elements, the inductive sensor elements may not be perfectly matched, resulting in the null (minimum) output from the half bridge inductive sensor element arrangement being offset from the mechanical centre of the half bridge arrangement. This null is referred to as the electrical centre of the half bridge inductive sensor element arrangement.

Figure 4:
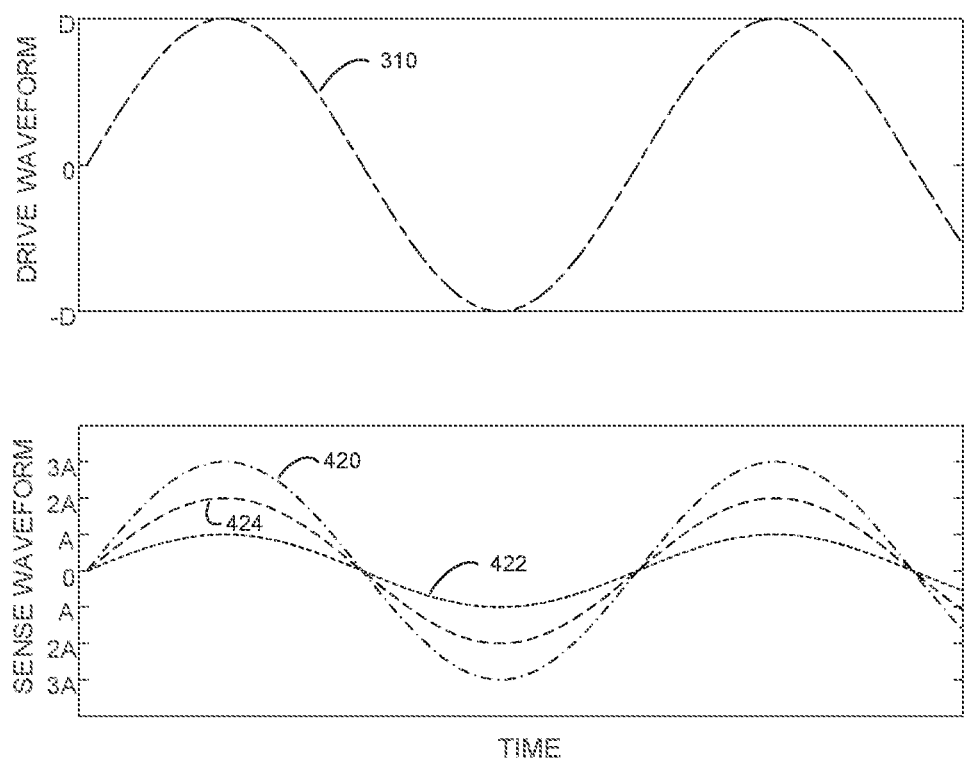
FIG. 4 shows an example of an offset waveform resulting from build tolerances causing the electrical or mechanical centre of the sensor elements to be offset from the mechanical centre of the touchdown bearings.

In the particular case of FIG. 4, the input gain for the Analogue-to-Digital Converter 250 may be set so that the largest signal (for example, with amplitude 3A in FIG. 4, where A is an arbitrary value representing the amplitude of the signal) observed when traversing the rotor 102 can be correctly sampled by the Analogue-to-Digital Converter 250 (or the front end of the analogue circuit where the synchronous de-modulation is implemented using analogue components). In the particular case shown in FIG. 4, the effect of this would be to reduce the sensitivity at the input of the synchronous de-modulation circuit 152, 154 (or Analogue-to-Digital Converter 250) by a factor of ⅓, with a corresponding decrease in signal to noise ratio.

Figure 5:
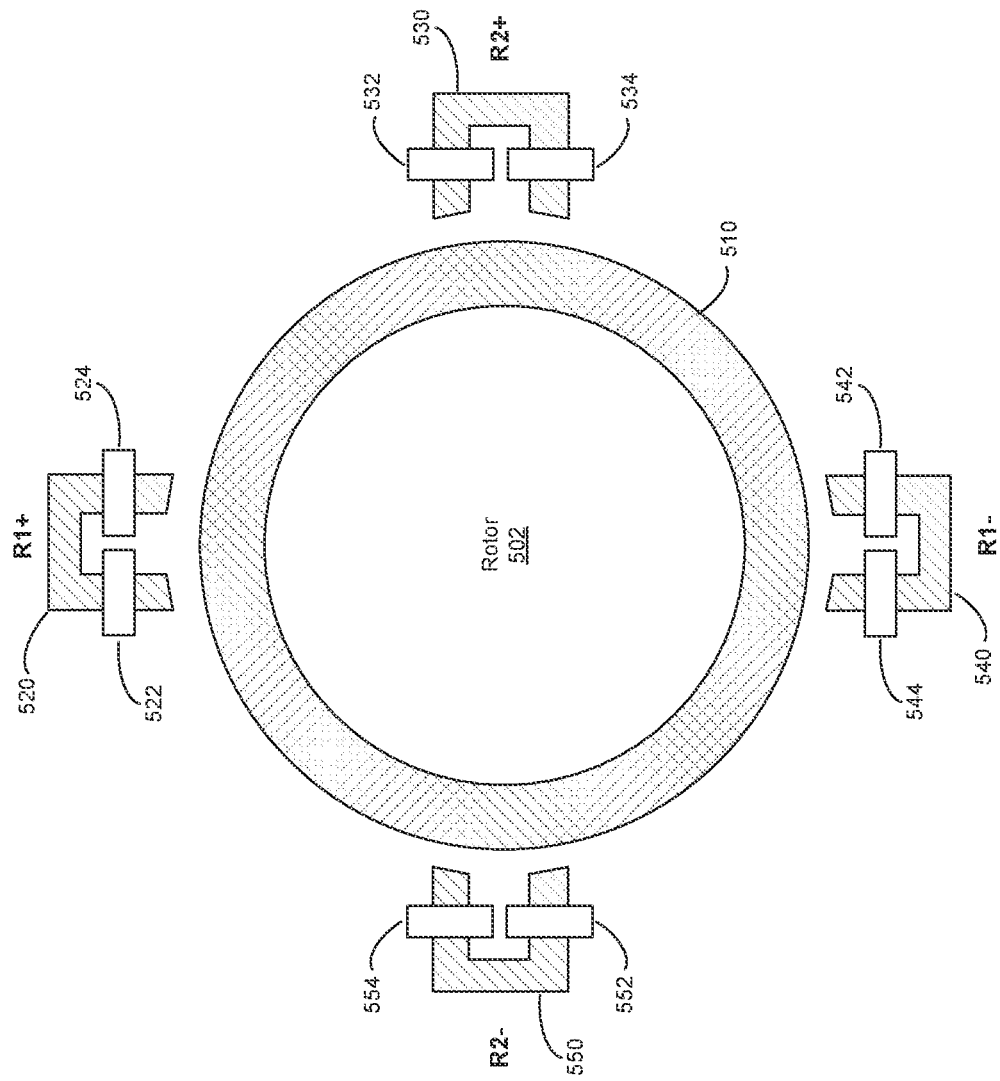
FIG. 5 shows a typical geometry for a radial inductive position sensor used within an Active Magnetic Bearing system.

FIG. 5 shows an example of a typical construction of a radial inductive sensor arrangement used within an Active Magnetic Bearing system, as per FIG. 1. FIG. 5 shows rotor shaft 502, with laminated reference ring 510. Inductive sensor element R1+ has laminated core 520 and coils 522 and 524. Inductive sensor element R2+ has laminated core 530 and coils 532 and 534. Inductive sensor element R1− has laminated core 540 and coils 542 and 544. Inductive sensor element R2− has laminated core 550 and coils 552 and 554. Inductive sensor element R1+ is arranged diametrically opposite inductive sensor element R1−. Inductive sensor element R2+ is arranged diametrically opposite inductive sensor element R2−. Inductive sensor elements R1+ and R1− are electrically connected in a first half bridge arrangement. Inductive sensor elements R2+ and R2− are electrically connected in a second half bridge arrangement. FIG. 5 does not show any of the actuator parts or the touchdown bearings of an Active Magnetic Bearing system, and merely serves to illustrate one example arrangement of sensor elements.

Figure 6:
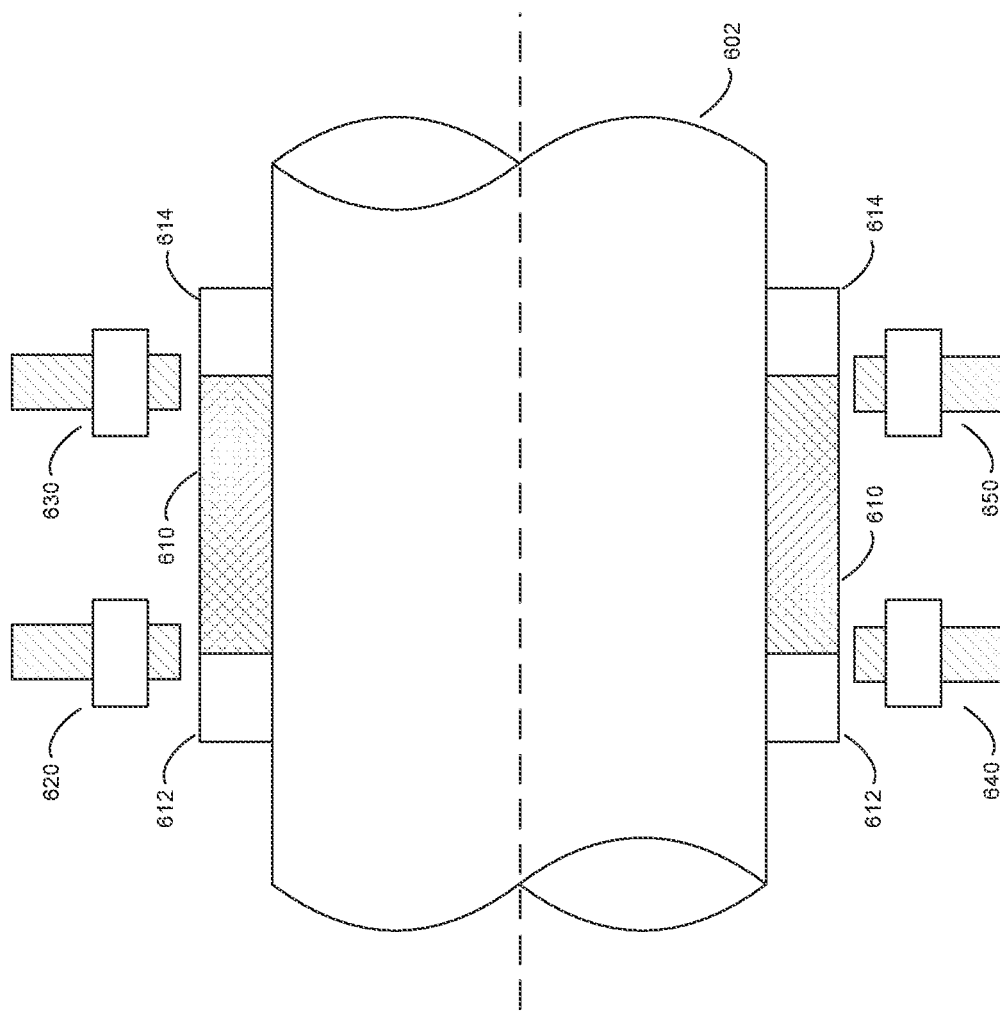
FIG. 6 shows a typical geometry for an axial inductive position sensor used within an Active Magnetic Bearing system.

FIG. 6 shows an example of a typical construction of an axial inductive slip sensor arrangement used within an Active Magnetic Bearing system, which may be used to detect the position of the rotor along the rotor axis. As with a radial sensor arrangement of FIG. 5, in the axial arrangement the inductive sensor is formed of pairs of opposed inductive sensor elements each wired to form a half bridge arrangement, and arranged along the axis of the rotor. FIG. 6 shows a core shaft or rotor 602 with laminated reference ring 610. Laminated reference ring 610 may be supported by non-active mechanical support parts 612 and 614, which may be constructed from a non-magnetic material. Non-active mechanical support parts 612 and 614 may serve to keep the laminations of laminated reference ring 610 compressed. Non-active mechanical support parts 612 and 614 may also provide a boundary between the magnetic material of laminated reference ring 610 and non-active mechanical support parts 612 and 614. Inductive sensing elements 620 and 640 (which may alternatively be referred to as axial sensor rings) together form one element of a half bridge arrangement. Sensing elements 630 and 650 together form the other element of the half bridge arrangement. FIG. 6 does not show any of the actuator parts or the touchdown bearings of an Active Magnetic Bearing system, and merely serves to illustrate one example arrangement of sensor elements.

Figure 7:
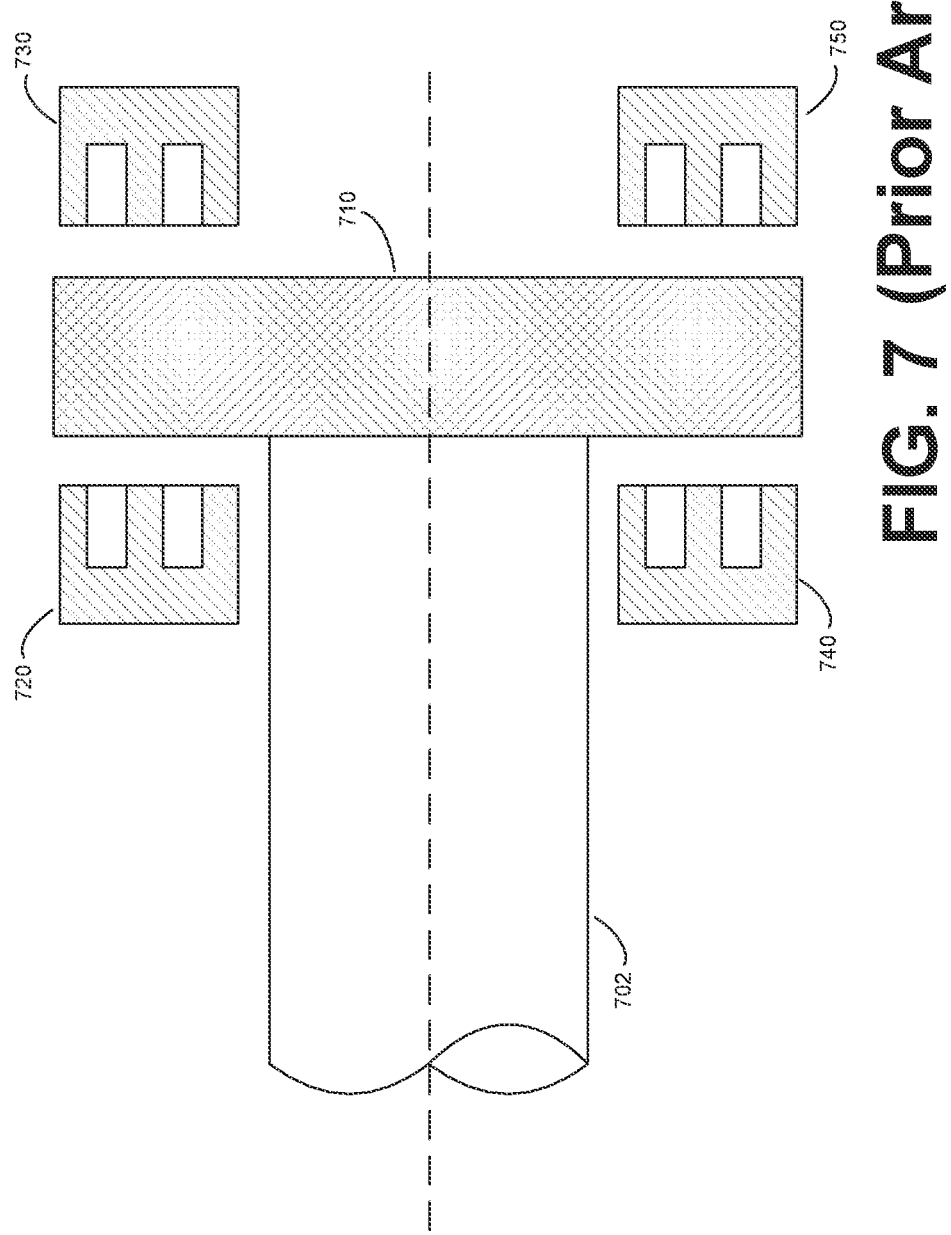
FIG. 7 shows a typical geometry using a disk as a reference ring for an axial inductive position sensor used within an Active Magnetic Bearing system.

FIG. 7 shows an alternative example of a typical construction of an axial inductive sensor arrangement using a disk as the target. FIG. 7 shows a rotor 702 with a solid ferrite disc or laminated reference ring 710. Inductive sensing elements 720 and 740 together form one element of a half bridge arrangement. Inductive sensing elements 730 and 750 form the other element of the half bridge arrangement. FIG. 7 does not show any of the actuator parts or the touchdown bearings of an Active Magnetic Bearing system, and merely serves to illustrate one example arrangement of sensor elements.

An improved signal conditioning circuit disclosed herein provides the addition of a controlled amount of the sinusoidal drive signal used within the drive circuit to the signals output by the half bridge inductive sensor element arrangements (132a, 132b; 134a, 134b). The added signal will be of a controlled amplitude and for a particular axis, and may be of either positive or negative phase depending on the required correction for the particular half bridge sensor element arrangement.

Figure 8:
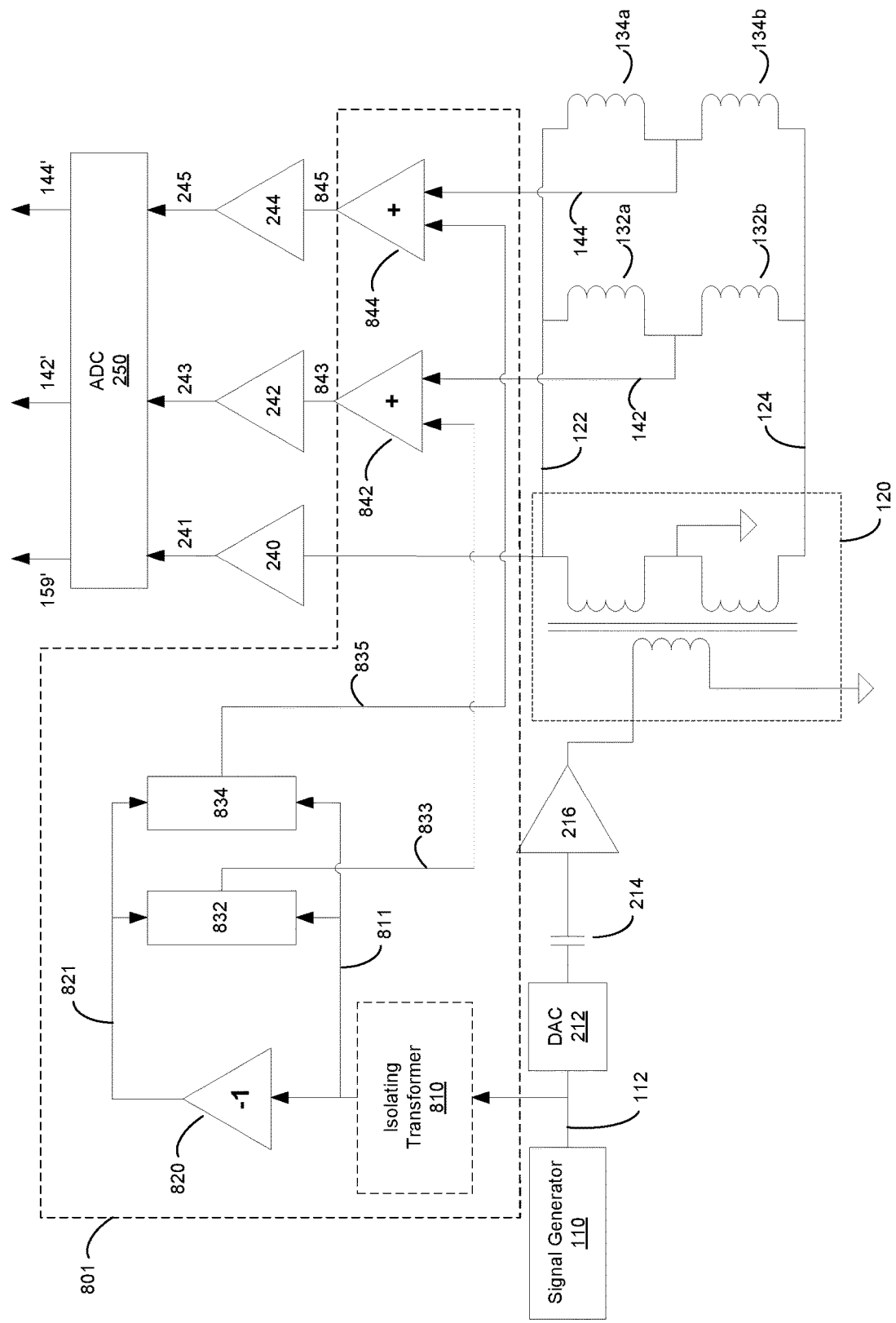
FIG. 8 shows an improved sensor design for an inductive position sensor arrangement, in accordance with embodiments of the disclosure.

FIG. 8 shows a schematic of an improved sensor and signal conditioning circuit design in accordance with embodiments of the disclosure. The improved signal conditioning circuit of FIG. 8 is an improved version of the signal conditioning circuit of FIG. 2. Accordingly, the same reference numerals are used to indicate elements which are the same as those in FIG. 2. FIG. 8 shows signal generator 110 used to generate a sinusoidal drive signal at a required frequency. Signal generator 110 is coupled by connection 811 to supply a copy of drive signal 112 to a negative gain circuitry 820 (which may be alternatively referred to as an inverting amplifier, which may or may not have unity gain), and to a first input of each of first and second correction signal adjustment means 832 and 834 (where correction signal adjustment means 832 and 834 may be, for example, a potentiometer). Negative gain circuitry 820 is configured to generate a copy of drive signal 112 with an inverted polarity. An output of negative gain circuitry 820 is coupled by connection 821 to a second input of each of first and second correction signal adjustment potentiometers 832 and 834. First and second correction signal adjustment potentiometers 832 and 834 are each operable to scale a first and second correction signal by adjusting the amplitude and/or polarity of the signals at 811 and 821. The first correction signal output 833 of first correction signal adjustment potentiometer 832 is summed with the sensed signal 142 from first pair of inductive sensor elements 132a, 132b at summing block 842. Likewise, the second correction signal output 835 of second correction signal adjustment potentiometer 834 is summed with the sensed signal 144 from the second pair of inductive sensor elements 134a, 134b at summing block 844. The outputs 843 and 845 of summing blocks 842 and 844 respectively are amplified by amplifier stages 242 and 244, respectively. As in FIG. 2, the outputs 241, 243 and 245 of amplifier stages 240, 242 and 244 respectively are coupled to the inputs of one or more Analogue-to-Digital Converters (ADC) 250. The elements within block 801 may collectively be referred to as signal correction circuitry 801.

Optionally, first and second correction signals 833 and 835 may be isolated from signal generator 110 by use of a transformer 810 or other such isolating means in order to reduce the effect of ground noise on first and second correction signals 833 and 835. In some embodiments, a separate isolation means may be used for each of correction signals 833 and 835.

In FIG. 8, the scaling of first and second correction signals 833 and 835 is shown as being controlled by first and second correction signal adjustment potentiometers 832 and 834, however scaling of the correction signals may alternatively be implemented using a range of techniques including: potentiometers, digitally controlled potentiometers, selected fixed resistors, etc. These techniques are intended to be non-limiting examples only.

The embodiment of FIG. 8 provides an inductive sensor element arrangement and signal conditioning circuit for two-axis sensing of an Active Magnetic Bearing. Alternative embodiments may provide sensor element arrangements and signal conditioning circuits for one or more axes of detection.

The effect of applying the correction signals (for the ideal circuit) is to bring the resulting signal amplitude to zero when the rotor is at the mechanical centre of the touchdown bearings, and to achieve a similar amplitude at the two extreme positions (but with opposed phase for the two extreme positions), as for the ideal waveforms shown in FIG. 3.

In some embodiments the input gains 242 and 244 to Analogue-to-Digital Converter 250 may be adjustable to facilitate further optimisation of the signal amplitude with respect to the input range of the Analogue-to-Digital Converter 250 (or analogue synchronous de-modulation circuitry for an analogue implementation), as noted above with respect to FIG. 2.

Figure 9A:
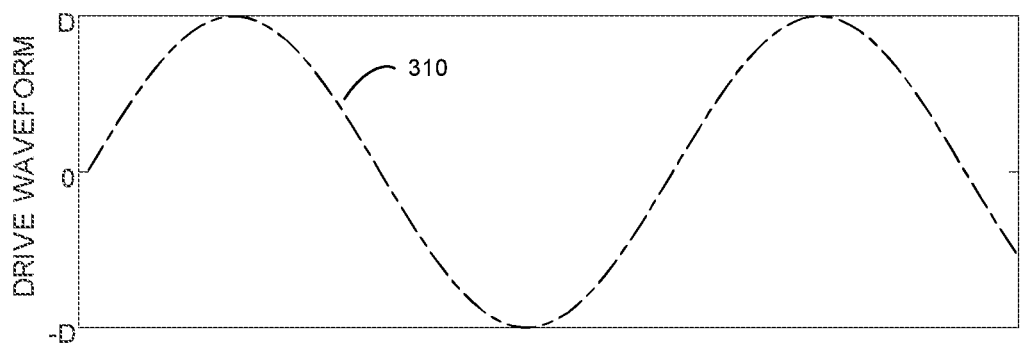
Figure 9A:
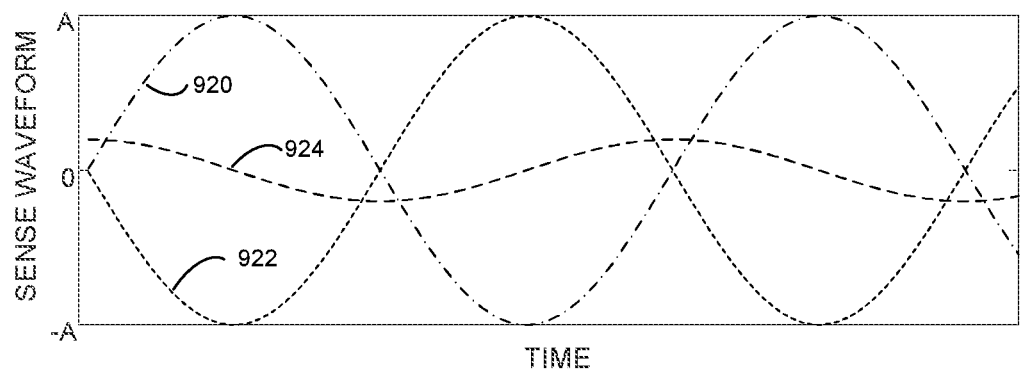
Figure 9A:
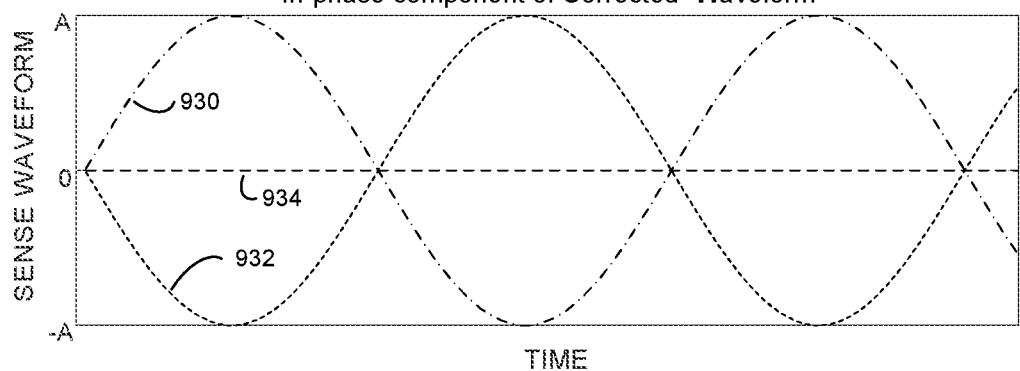

In practice, due to mismatched inductances, capacitive cable effects and resistance, the corrected output signal at the mechanical centre position may be a non-zero quadrature signal, but when synchronously de-modulated this gives zero in-phase signal as desired. FIG. 9B shows an example of a corrected output signal where the signal at the mechanical centre position (waveform 924) is a non-zero quadrature signal, where waveform 920 shows the signal for maximum positive displacement of rotor 102 and waveform 922 shows the signal for maximum negative displacement of rotor 102. The non-perfect quadrature signal when at the mechanical centre position does not affect the improvement in signal to noise ratio achieved by the improved signal conditioning circuit disclosed herein. FIG. 9C shows the in-phase components (930, 932, 934) of the corrected waveform, where waveform 930 shows the signal for maximum positive displacement of rotor 102, waveform 932 shows the signal for maximum negative displacement of rotor 102, and waveform 934 shows the signal for rotor 102 in the mechanical centre position.

Figure 10:
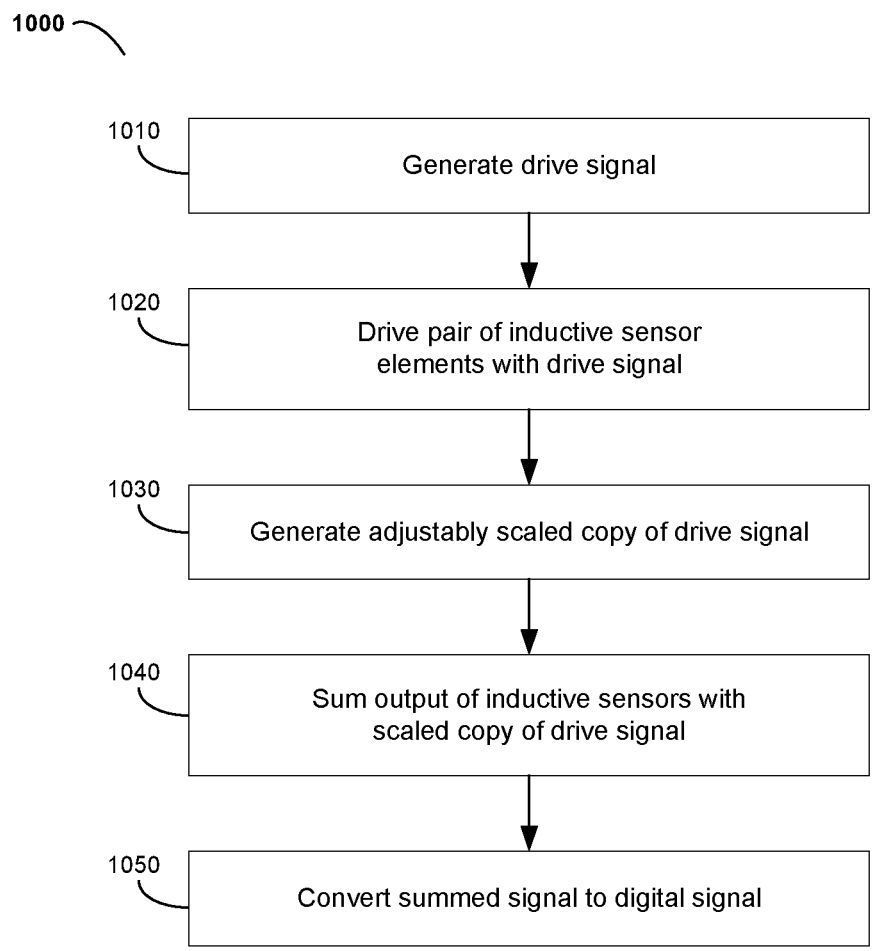
FIG. 10 shows a flowchart of a method for conditioning output signals from an inductive sensor arrangement.

FIG. 10 shows an example method 1000 for conditioning an output signal of a pair of inductive sensor elements. At block 1010, a drive signal is generated. In some examples this may be carried out by a signal generator, such as signal generator 110 of FIG. 1. In some examples the drive signal may be sinusoidal drive signal 112 of FIG. 1. At block 1020, the drive signal is used to drive a pair of inductive sensor elements. In some examples, the pair of inductive sensor elements may be connected in a half bridge arrangement. The pair of inductive sensor elements may be the same as inductive sensor element arrangement 132a, 132b or inductive sensor element arrangement 134a, 143b of FIG. 1. At block 1030 an adjustably scaled copy of the drive signal is generated. In some examples, the adjustably scaled copy of the drive signal is isolated from the drive signal via isolation means. In some examples the isolation means may be one or more isolating transformers. In some examples the scaled copy of the drive signal is adjusted via one or more of a potentiometer, a digitally controlled potentiometer, or selected fixed resistors. At block 1040, an output signal of the pair of inductive sensor elements is summed with the adjustably scaled copy of the drive signal. At block 1050 the summed signal is converted to a digital signal. In some examples, the summed signal is converted using one or more Analogue-to-Digital Converters, such as Analogue-to-Digital Converter 250 of FIG. 2 or FIG. 5.

A benefit of the improved signal conditioning circuit disclosed herein is that the improved signal conditioning circuit permits looser tolerances on the concentricity between the touchdown bearings, whilst still maintaining an optimal signal to noise ratio. The improved signal conditioning circuit is also tolerant of mismatches in the impedance of the opposed inductive sensor elements forming each half bridge arrangement.

The improved signal conditioning circuit disclosed herein is applicable to both radial and axial sensor arrangements used in Active Magnetic Bearing systems.

For axial bearings, the use of the improved signal conditioning circuit can reduce the need for mechanical shims normally used to align the electrical centre of the half bridge inductive sensor arrangement in the axial direction with the mechanical centre of the touchdown bearings in the axial direction.

For a typical Active Magnetic Bearing there will typically be one signal conditioning circuit for each axis of the Active Magnetic Bearing system.

The teachings herein are presented with reference to inductive position sensing elements. It should be understood that the teachings are equally applicable to eddy-current position sensing elements. In some embodiments implementing eddy-current sensor elements, the reference ring may be constructed of a solid conducting material. In some embodiments using eddy-current sensor elements, the frequency of the sinusoidal drive signal may be higher than for implementations using inductive position sensing elements.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, various elements or components may be combined or integrated in another system or certain features may be omitted, or not implemented.

Also, techniques, systems, subsystems and methods described and illustrated in the various embodiments as discrete or separate may be combined or integrated with other systems, modules, techniques or methods without departing from the scope of the present disclosure. Other items shown or discussed as coupled or directly coupled or communicating with each other may be indirectly coupled or communicating through some interface, device or intermediate component, whether electrically, mechanically, or otherwise. Other examples of changes, substitutions and alterations are ascertainable by one skilled in the art and could be made without departing from the scope disclosed herein.

Examples of the invention provide an inductive sensing circuit, comprising: a signal generator, configured to generate a drive signal; one or more sensing arrangements, each of the one or more sensing arrangements comprising: two sets of one or more inductive sensing elements, configured in a half bridge arrangement, the two sets of one or more inductive sensing elements driven by the drive signal; a correction signal circuit, configured to generate a correction signal, wherein the correction signal is an adjustably scaled version of the drive signal; and a summing circuit, configured to sum an output signal of the two sets of one or more inductive sensing elements with the correction signal; and a demodulation circuit, configured to demodulate an output of the summing circuit of each of the one or more sensing arrangements.

In some examples, or any other embodiments or examples disclosed herein, the demodulation circuit comprises an analogue to digital converter configured to convert an output of the summing circuit of each of the one or more sensing arrangements to a corresponding digital output signal.

In some examples, or any other embodiments or examples disclosed herein, each of the one or more sensing arrangements further comprises a signal adjustment means configured to adjust the scaling of the correction signal.

In some examples, or any other embodiments or examples disclosed herein, the signal adjustment means is a potentiometer.

In some examples, or any other embodiments or examples disclosed herein, the two sets of inductive sensing elements of a first sensing arrangement of the one or more sensing arrangements are arranged about a circumference of a rotor.

In some examples, or any other embodiments or examples disclosed herein, the two sets of inductive sensing elements of a first sensing arrangement of the one or more sensing arrangements are arranged along an axis of a rotor. The two sets of inductive sensing elements arranged along an axis of the rotor may be either arranged along the axis of rotation of the rotor, or may be arranged at angles perpendicular to the axis of rotation of the rotor about the circumference of the rotor. In some examples, the two sets of inductive sensing elements of a first sensing arrangement may be combined with the two sets of inductive sensing elements of a second sensing arrangement positioned at an angle about the circumference of the rotor to the two sets of inductive sensing elements of the first sensing arrangement, to create a virtual angle of position which is perpendicular to a real angle of position of the two sets of inductive sensing elements of a third sensing arrangement.

In some examples, or any other embodiments or examples disclosed herein, each of the one or more sensing arrangements further comprises an amplifier circuit coupled between an output of the summing circuit and the demodulation circuit.

Some examples, or any other embodiments or examples disclosed herein, further comprise a transformer to isolate the signal generator from the correction signal circuit of each of the one or more sensing arrangements.

In some examples, or any other embodiments or examples disclosed herein, the drive signal is a sinusoidal signal. In some examples the drive signal may instead be a square wave signal. A sinusoidal drive signal may offer the advantage of providing a 'cleaner' signal for driving the inductive sensor elements. A sinusoidal drive signal may offer the advantage of causing less unwanted effects due to harmonics, compared to a square wave drive signal.

In some examples, or any other embodiments or examples disclosed herein, the drive signal is digitally generated.

Some examples, or any other embodiments or examples disclosed herein, further comprising a digital-to-analogue converter coupled to an output of the signal generator.

Some examples, or any other embodiments or examples disclosed herein, further comprising means for removing a DC component of the drive signal.

Some examples, or any other embodiments or examples disclosed herein, further comprise a balanced voltage drive, configured to drive the two sets of one or more inductive sensing elements of each of the one or more sensing arrangements. In some examples, the voltage drive may instead be single-ended.

In some examples, or any other embodiments or examples disclosed herein, the balanced voltage drive comprises a transformer with multiple secondary windings.

In some examples, or any other embodiments or examples disclosed herein, the demodulation further comprises one or more synchronous de-modulation circuits coupled to one or more outputs of the analogue-to-digital converter.

In some examples, or any other embodiments or examples disclosed herein, the one or more synchronous de-modulation circuits are configured to remove noise from the one or more outputs of the analogue-to-digital converter.

Some examples, or any other embodiments or examples disclosed herein, further comprise means for performing a ratiometric function.

In some examples, or any other embodiments or examples disclosed herein, the signal generator is configured to provide a synchronisation signal to one or more of the synchronous de-modulation circuits.

In some examples, or any other embodiments or examples disclosed herein, the inductive sensor elements are eddy current sensor elements.

Examples of the invention provide an active magnetic bearing, comprising the inductive sensing circuit of any example or embodiment herein.

Examples provide a method for correcting an output signal of two sets of one or more inductive sensor elements, the method comprising: generating a drive signal; driving the two sets of one or more inductive sensor elements by applying the drive signal; generating a correction signal, wherein the correction signal is an adjustably scaled copy of the drive signal; summing the output signal of the two sets of one or more inductive sensor elements with the correction signal; and demodulating the summed signal.

In some examples, or any other embodiments or examples disclosed herein, demodulating the summed signal comprises converting the summed output signal of the two sets of one or more inductive sensor elements to a corresponding digital output signal.

Some examples, or any other embodiments or examples disclosed herein, further comprise adjusting the scaling of the correction signal via a signal adjustment means.

In some examples, or any other embodiments or examples disclosed herein, the signal adjustment means is a potentiometer.

Some examples, or any other embodiments or examples disclosed herein, further comprise amplifying the summed output signal of the two sets of one or more inductive sensor elements.

Some examples, or any other embodiments or examples disclosed herein, further comprise isolating a copy of the drive signal for use in generating the correction signal.

In some examples, or any other embodiments or examples disclosed herein, the drive signal is a sinusoidal signal.

In some examples, or any other embodiments or examples disclosed herein, the drive signal is generated digitally.

Some examples, or any other embodiments or examples disclosed herein, further comprise converting the digitally generated drive signal to an analogue drive signal.

Some examples, or any other embodiments or examples disclosed herein, further comprise removing a DC component of the drive signal.

In some examples, or any other embodiments or examples disclosed herein, demodulating the summed signal further comprises synchronously demodulating the digital output signal.

In some examples, or any other embodiments or examples disclosed herein, synchronously demodulating the digital output signal comprises removing noise from the digital output signal.

Some examples, or any other embodiments or examples disclosed herein, further comprise performing a ratiometric function.

In some examples, or any other embodiments or examples disclosed herein, the inductive sensor elements are eddy current sensor elements.

The invention claimed is:

1. An inductive sensing circuit, comprising:
   a signal generator, configured to generate a drive signal;
   one or more sensing arrangements, each of the one or more sensing arrangements comprising:
   two sets of one or more inductive sensing elements, configured in a half bridge arrangement, the two sets of one or more inductive sensing elements driven by the drive signal;
   a correction signal circuit, configured to generate a correction signal, wherein the correction signal is an adjustably scaled version of the drive signal; and
   a summing circuit, configured to sum an output signal of the two sets of one or more inductive sensing elements with the correction signal; and
   a demodulation circuit, configured to demodulate an output of the summing circuit of each of the one or more sensing arrangements.

2. The inductive sensing circuit of claim 1, wherein the demodulation circuit comprises an analogue to digital converter configured to convert an output of the summing circuit of each of the one or more sensing arrangements to a corresponding digital output signal.

3. The inductive sensing circuit of claim 2, wherein the demodulation circuit further comprises one or more synchronous de-modulation circuits coupled to one or more outputs of the analogue-to-digital converter.

4. The inductive sensing circuit of claim 3, wherein the one or more synchronous de-modulation circuits are configured to remove noise from the one or more outputs of the analogue-to-digital converter.

5. The inductive sensing circuit of claim 3, wherein the signal generator is configured to provide a synchronisation signal to one or more of the synchronous de-modulation circuits.

6. The inductive sensing circuit of claim 1, wherein each of the one or more sensing arrangements further comprises a signal adjustment means configured to adjust the scaling of the correction signal.

7. The inductive sensing circuit of claim 1, wherein the two sets of inductive sensing elements of a first sensing arrangement of the one or more sensing arrangements are arranged about a circumference of a rotor.

8. The inductive sensing arrangement of claim 1, wherein the two sets of inductive sensing elements of a first sensing arrangement of the one or more sensing arrangements are arranged along an axis of a rotor.

9. The inductive sensing circuit of claim 1, wherein each of the one or more sensing arrangements further comprises an amplifier circuit coupled between an output of the summing circuit and the demodulation circuit.

10. The inductive sensing circuit of claim 1, further comprising a transformer to isolate the signal generator from the correction signal circuit of each of the one or more sensing arrangements.

11. The inductive sensing circuit of claim 1, wherein the drive signal is a sinusoidal signal.

12. The inductive sensing circuit of claim 1, further comprising a balanced voltage drive configured to drive the two sets of one or more inductive sensing elements of each of the one or more sensing arrangements.

13. The inductive sensing circuit of claim 1, wherein the inductive sensor elements are eddy current sensor elements.

14. A method for correcting an output signal of two sets of one or more inductive sensor elements, the method comprising:
generating a drive signal;
driving the two sets of one or more inductive sensor elements by applying the drive signal;
generating a correction signal, wherein the correction signal is an adjustably scaled copy of the drive signal;
summing the output signal of the two sets of one or more inductive sensor elements with the correction signal; and
demodulating the summed signal.

15. The method of claim 14, wherein demodulating the summed signal comprises converting the summed output signal of the two sets of one or more inductive sensor elements to a corresponding digital output signal.

16. The method of claim 14, further comprising isolating a copy of the drive signal for use in generating the correction signal.

17. The method of claim 14, further comprising removing a DC component of the drive signal.

18. The method of claim 14, wherein demodulating the summed signal further comprises synchronously demodulating the digital output signal.

19. The method of claim 18, wherein synchronously demodulating the digital output signal comprises removing noise from the digital output signal.

20. The method of claim 18, further comprising performing a ratiometric function.

* * * * *